(12) United States Patent
Le Calve

(10) Patent No.: US 6,354,415 B1
(45) Date of Patent: Mar. 12, 2002

(54) FREE WHEEL DEVICE WITH LATERAL PLAIN BEARINGS

(75) Inventor: Marc Le Calve, Cerelles (FR)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/451,767

(22) Filed: Dec. 1, 1999

(30) Foreign Application Priority Data

Dec. 2, 1998 (FR) .............................. 98 15227

(51) Int. Cl.[7] .............................................. F16D 41/07
(52) U.S. Cl. ..................... 192/45.1; 192/41 A
(58) Field of Search ................. 192/45.1, 41 A, 192/45, 41 R

(56) References Cited

U.S. PATENT DOCUMENTS

| | | | |
|---|---|---|---|
| 4,875,564 A | * 10/1989 | Leitz et al. | 192/45.1 |
| 5,156,245 A | * 10/1992 | Fujiwara et al. | 192/45.1 X |
| 5,415,258 A | * 5/1995 | Numata | 192/45.1 X |
| 5,526,910 A | * 6/1996 | Laurent | 192/45.1 |
| 6,079,533 A | * 6/2000 | Deglise-Favre et al. | 192/45.1 |

FOREIGN PATENT DOCUMENTS

| | | |
|---|---|---|
| EP | 0 611 898 A1 | 8/1994 |
| FR | 2 583 843 | 12/1986 |

* cited by examiner

Primary Examiner—Charles A Marmor
Assistant Examiner—Saúl Rodriguez
(74) Attorney, Agent, or Firm—Smith, Gambrell & Russell

(57) ABSTRACT

Free wheel device, of the type corn sing an outer ring equipped with an interior slideway, an inner ring or shaft equipped with an exterior slideway, a free wheel placed between the slideway of the outer ring and the slideway of the inner ring and comprising a number of cams placed in windows of a cylindrical part of a single cage and providing a one-way coupling between the outer and inner rings, and at least one bearing placed radially between the outer an inner rings and intended to keep the outer and inner rings concentric. At least a free end of the cylindrical part of the cage is centered radially on a cylindrical guiding bearing surface formed on the bearing adjacent to the free end, the cylindrical bearing surface being arranged so that it is coaxial with the slideways, approximately mid-way between the slideways.

14 Claims, 4 Drawing Sheets

Prior Art

FREE WHEEL DEVICE WITH LATERAL PLAIN BEARINGS

FIELD OF THE INVENTION

The present invention relates to the field of free wheel devices.

BACKGROUND OF THE INVENTION

Free wheel devices generally comprise an outer ring equipped with a cylindrical interior slideway for cams of the free wheel, an inner ring or shaft equipped with a cylindrical exterior slideway for the said cams of the free wheel, a free wheel situated between the slideway of the outer ring and the slideway of the inner ring or of the shaft, and one or more members forming bearings which are intended to keep the outer and inner rings concentric and to transmit the radial forces between the said rings.

The bearings are in the form of a component of annular overall shape comprising a radial part in the shape of a roughly flat washer delimited by two circular rims to each of which an axial portion attaches.

The axial portions rest against corresponding bearing surfaces of the rings which may be an axial extension of the slideways, thus providing centring between the two rings by acting as plain bearings.

The free wheel comprises a single cage or a double cage consisting of two concentric cages, equipped with windows in which there are placed cams which, by jamming or by sliding between the two slideways, provide a one-way coupling between the outer and inner rings.

The cage generally comprises, at least on one side, a radial flank allowing the cage to be centred inside the corresponding bearing by coming into contact with one of the axial portions of a bearing.

The free wheel is thus capable of transmitting torque in one direction between the outer and inner rings and of allowing free rotation in the other direction.

To encourage the cams to pivot in the direction which encourages locking, there may be a spring which is in the form of a band exerting on each cam a return torque which tends to keep the cams permanently in contact with the slideways.

These devices are used, for example, in automatic transmissions for motor vehicles.

The conventional lateral bearings used for such free wheel devices are annular bearings of U-shaped cross section, it being possible for the said bearings to be produced by turning or by pressing metallic materials such as steel (turning) or alternatively copper-based alloys (the pressing of sheet brass, for example).

The two axial branches of the U constitute, via their cylindrical outer surfaces, the bearing surfaces for the sliding and centring of the said bearings on corresponding bearing surfaces of the inner and outer rings of the free wheel device.

These two axial branches are joined together by a radial portion constituting the strong web of the bearing and serving to transmit radial forces between the two rings.

The bearings are generally mounted with the branches of the U pointing towards the cage so that the said cage can be centred inside an axial branch of the bearing.

The centring function is thus fulfilled without increasing the axial size of the assembly.

A device of this type is known, for example, from patent FR 8509583 (Publication No. 2583843).

While such devices are entirely satisfactory, a number of problems are encountered in achieving accurate radial centring of the cage in the bearing.

Specifically, in the case of a single cage and conventional U-section bearings, the cylindrical annular part of the cage is located approximately mid-way between the axial branches of the bearing.

The result of this is that the height of the radial flank of the said cage has to be relatively great so that it can be centred inside the axial branch of the bearing, and this leads to a consumption of materials. The presence of these flanks increases the cost of materials and the weight.

On the other hand, the accuracy that can be obtained on the outside diameter of the radial flank using conventional cutting and pressing methods is limited and does not guarantee perfect centring of the cage in the bearing.

One consequence during operation may be the emergence of vibrational problems which are due to a lack of radial guidance of the cage in the bearing.

SUMMARY OF THE INVENTION

The object of the present invention is to overcome the disadvantages of the devices of the prior art.

The object of the present invention is to provide a free wheel device that is economic, lightweight and not very subject to vibrations.

The free wheel device according to the invention is of the type comprising an outer ring equipped with an interior slideway, an inner ring or shaft equipped with an exterior slideway, a free wheel placed between the slideway of the outer ring and the slideway of the inner ring and comprising a number of cams placed in windows of a cylindrical part of a single cage and providing a one-way coupling between the outer and inner rings, and at least one bearing placed radially between the outer and inner rings and intended to keep the said outer and inner rings concentric. At least a free end of the cylindrical part of the cage is centred radially on a cylindrical guiding bearing surface formed on the bearing adjacent to the said free end, the said cylindrical bearing surface being arranged so that it is coaxial with the slideways, approximately radially mid-way between the slideways.

In one embodiment of the invention, the cage consists in a single cylindrical portion.

In another embodiment of the invention, the cage includes a cylindrical portion and a radial portion capable of coming into contact with a cylindrical surface of another bearing.

In one embodiment of the invention, the cylindrical guiding bearing surface is formed by the edge of an annular groove formed in a radial part of the bearing.

In another embodiment of the invention, the cylindrical guiding bearing surface is formed by the edge of an annular shoulder formed in a radial part of the bearing.

In one embodiment of the invention, the bearing consists in a disc provided with bearing surfaces for sliding on the outer and inner rings.

In another embodiment of the invention, the bearing comprises a radial part and two cylindrical parts forming sliding bearing surfaces on the outer and inner rings, the cylindrical guiding bearing surface being placed on the radial part.

It is advantageous for the bearing or bearings to be made of sintered metal because of the relatively low manufacturing costs, the good accuracy of the bearings obtained and the very good friction properties on steel bearing surfaces of the rings and/or of the shaft. Specifically, the structure of the sintered metal, which is made up of a metal powder whose particles are bound together by compression and heating in a mould, encourages the retention of lubricant at the surface, and this greatly improves the lubrication at the contact surfaces.

BRIEF DESCRIPTION OF THE DRAWINGS

The present invention will be better understood from studying the detailed description of a number of embodiments taken by way of entirely non-limiting examples and illustrated by the appended drawings, in which.

DETAILED DESCRIPTION OF THE INVENTION

Figure 1:
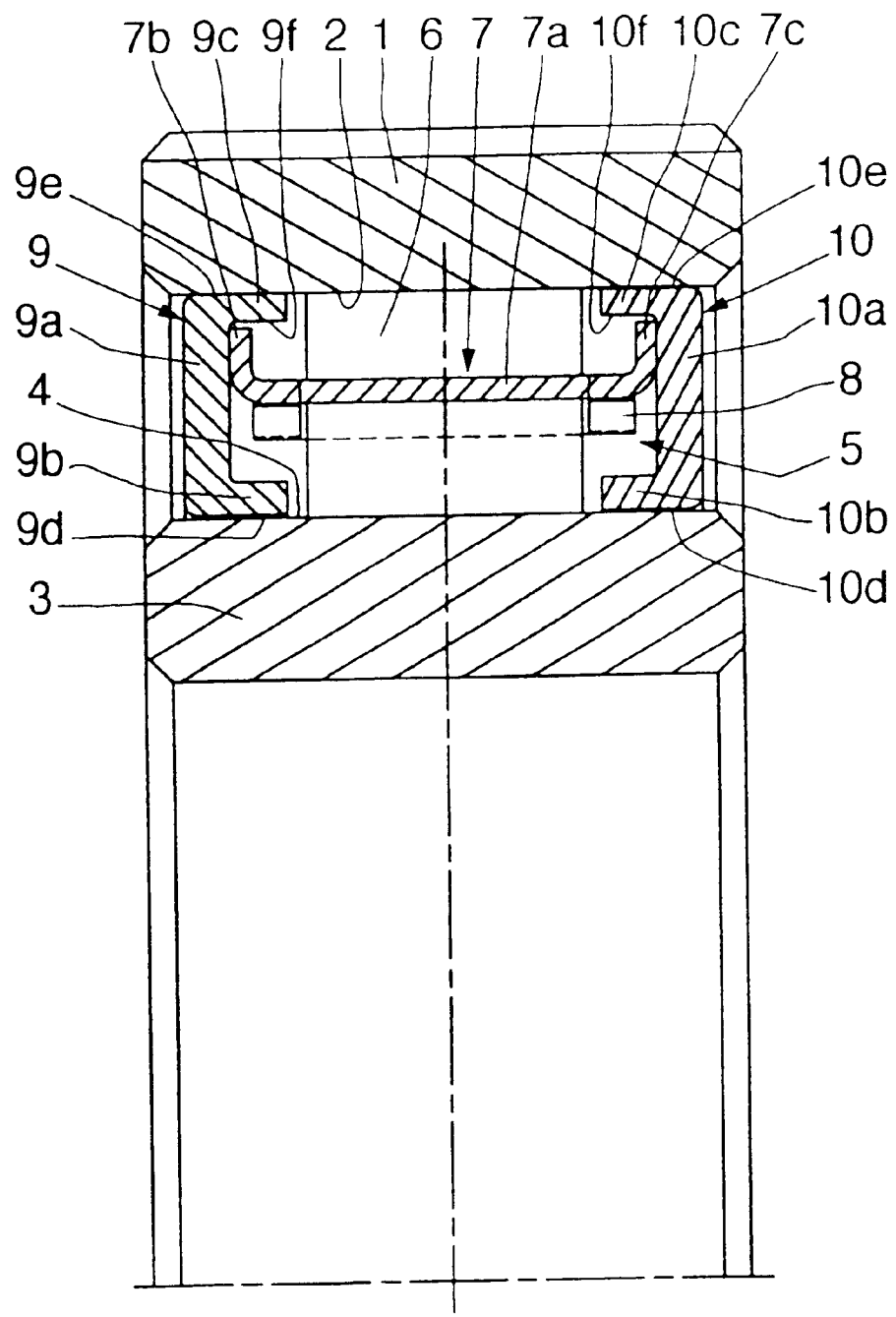
FIG. 1 is a half view in axial section of a free wheel device according to the prior art.

As can be seen in FIG. 1, the free wheel device according to the prior art comprises an outer ring 1 provided with a cylindrical bore 2, an inner ring 3 provided with a cylindrical exterior surface 4, these two rings being arranged coaxially. Placed between the outer ring 1 and the inner ring 3 is a free wheel 5 comprising a row of cams 6 and a cage 7 comprising a cylindrical axial central portion 7a and two radial end portions 7b and 7c pointing outwards. The cylindrical axial portion 7a is provided with windows in which the cams 6 are housed. A spring 8 is arranged concentrically and in contact with the cage 7 and presses on the cams 6 to ensure that they are permanently in contact with the cylindrical bore 2 and the cylindrical exterior surface 4, these two surfaces constituting the slideways for the cams 6. The torque thus exerted by the spring 8 on the cams 6 guarantees, in one direction of relative rotation between the inner ring 3 and the outer ring 1, that the cams will become jammed between the slideways and that a one-way torque will be transmitted between the two rings.

Also placed between the outer ring 1 and the inner ring 3 are two lateral plain bearings 9 and 10. As the two bearings 9 and 10 are identical, only the bearing 9 will be described. The bearing 9 is of annular shape with a U-shaped cross section, with a central radial portion 9a and two axial portions—an inner portion 9b and an outer portion 9c. The cylindrical bore 9d of the inner axial portion 9b is in contact with the cylindrical exterior surface 4, while the cylindrical exterior surface 9e of the outer axial portion 9c is in contact with the bore 2. Thus, the bearings 9 and 10 keep the outer ring 1 and the inner ring 3 concentric. The concentricity of the cage 7 is maintained by the radial portions 7b and 7c, the outwardly-pointing free ends of which can come into contact with the bore 9f of the outer axial portion 9c of the bearing 9 and with the corresponding bore 10f of the bearing 10.

Figure 2:
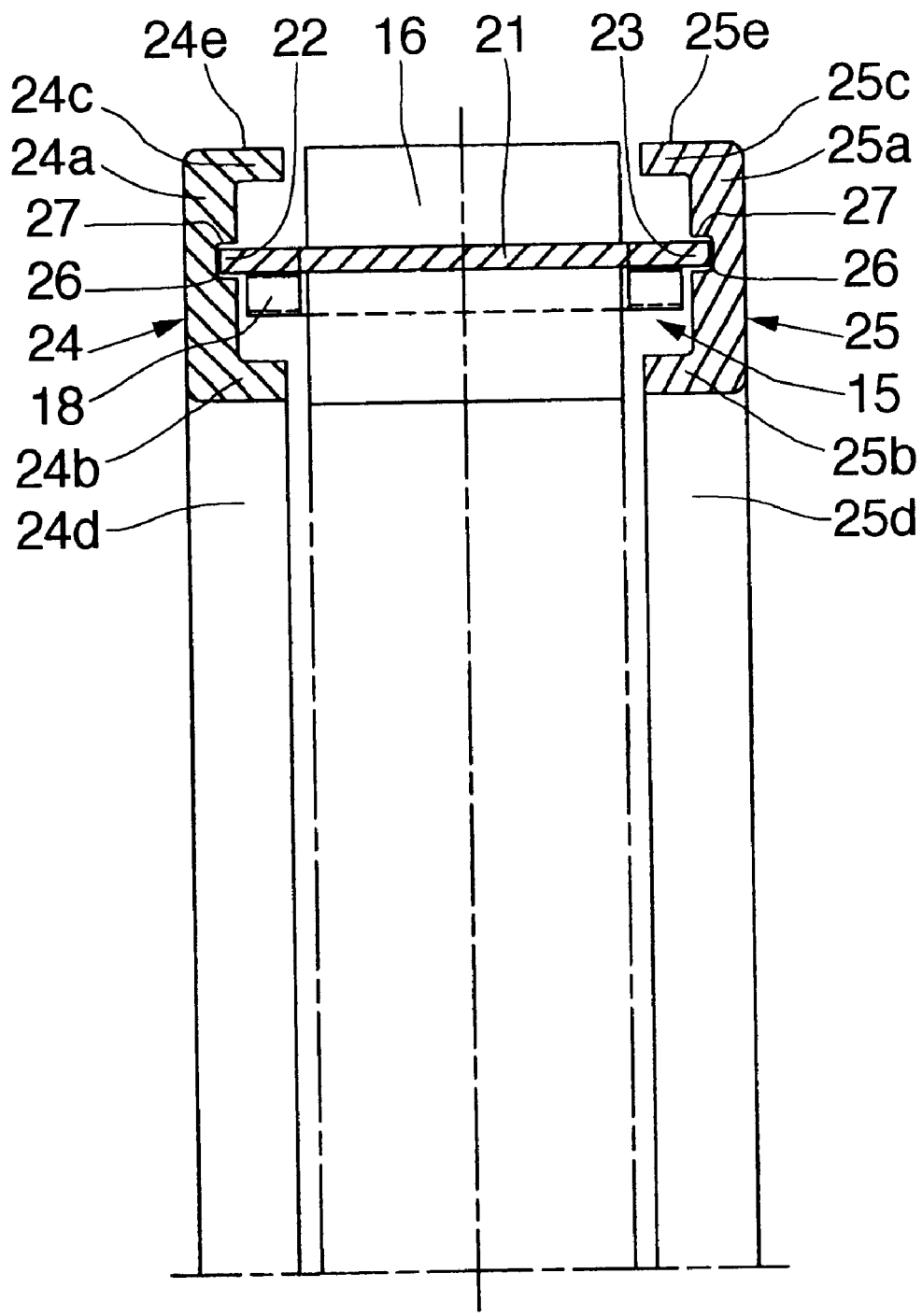
FIG. 2 is a half view in axial section of a free wheel device according to a first embodiment of the invention.

In FIG. 2, the references of elements which are similar to those of FIG. 1 have been increased by ten. The outer and inner rings have not been depicted.

The free wheel 15 comprises a cage 21 consisting of a single axial portion pierced with windows in which the cams 16 are housed, the free ends of the cage 21 bearing the references 22 and 23. There are two lateral plain bearings 24 and 25 to keep the rings concentric. As the bearings 24 and 25 are identical, only the bearing 24 will be described.

The bearing 24 comprises a radial portion 24a and two axial portions—an inner portion 24b and an outer portion 24c—arranged at the ends of the radial portion 24a. The cylindrical bore 24d of the inner axial portion 24b is designed to slide over an exterior cylindrical surface of the inner ring, while the exterior cylindrical surface 24e of the outer axial portion 24c is designed to slide over a bore of the outer ring. The radial part 24a is provided with an annular groove 26 arranged on its inside face, that is to say axially on the same side as the portions 24b and 24c and radially approximately at equal distances from the said portions 24b and 24c. The groove 26 is straight-sided, in other words has axial edges. The outer edge of the groove 26 forms an axial bearing surface 27 for guiding and centring the cage 21. What happens is that the axial length of the cage 21 is designed so that its end 22 projects into the groove 26 and can come into contact with the axial bearing surface 27. The other end 23 of the cage 21 is also designed to come into contact with the bearing surface 27 of the groove 26 made in the bearing 25.

The cage 21 can thus centre itself appropriately relative to the axis of rotation of the moving parts, while at the same time having no radial parts, this making it possible to avoid the pressing stages, to reduce the amount of material used to form the cage and therefore its weight, and thus reduce its cost.

Figure 3:
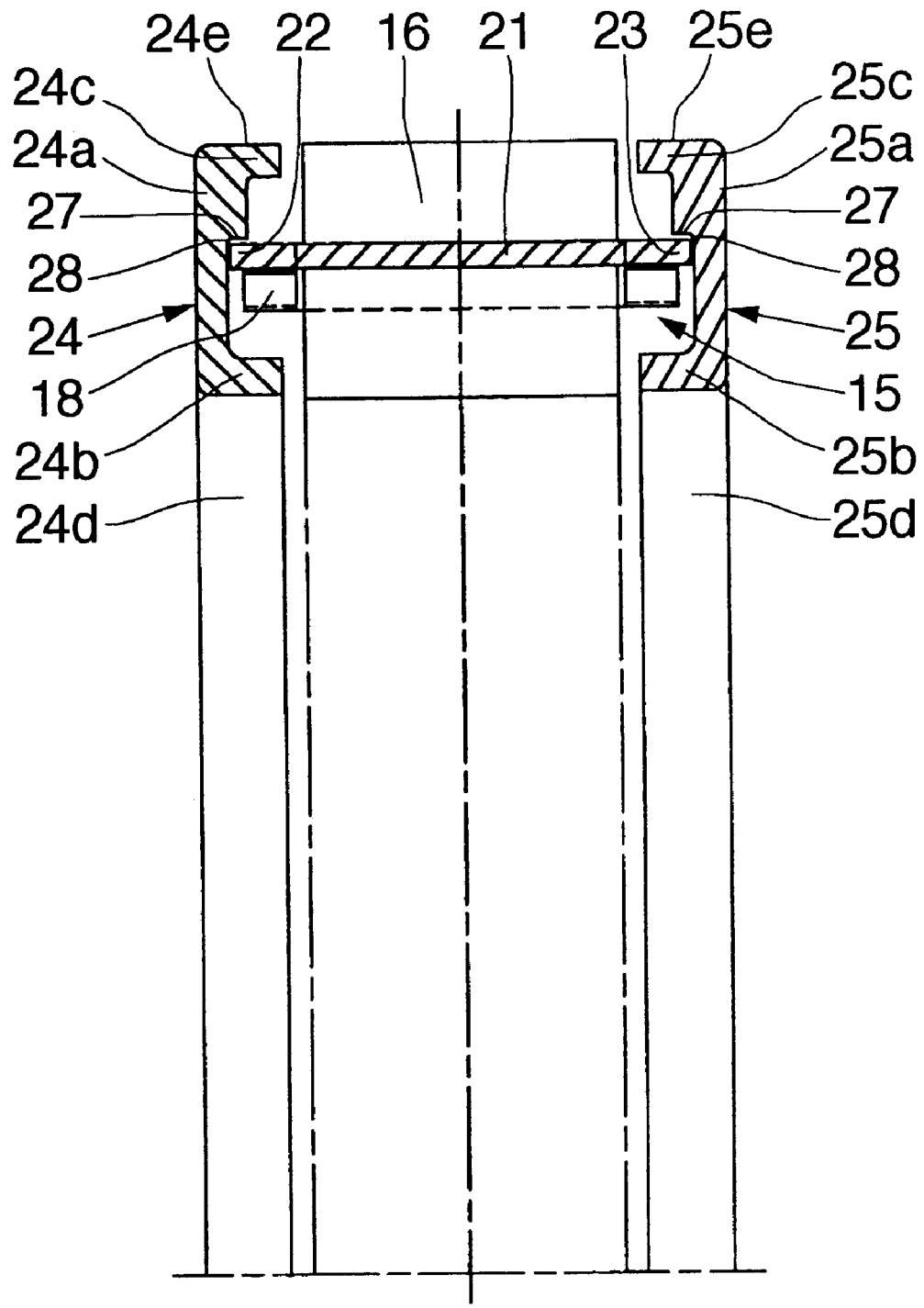
FIG. 3 is a half view in axial section of a free wheel device according to a second embodiment of the invention.

The embodiment illustrated in FIG. 3 is similar to that of FIG. 2, except for the bearings 24 and 25 which differ in a number of respects. On the inside face of the radial part 24a, axially on the same side as the parts 24b and 24c, the groove is replaced by a shoulder 28 which allows the cage 21 to be offered an axial bearing surface 27 for centring and guiding which is similar to the one in the embodiment of FIG. 2. This form of bearing also lends itself to direct manufacture from sintered metal without subsequent remachining. The annular space delimited radially by the cage 21 and by the inner ring is axially longer because of the smaller thickness of the radial portions 24a, 25a of the bearings at this point, and this makes it easier to accommodate the spring 18 without the risk of it rubbing on one of the bearings 24 or 25. It also reduces the amount of material used to form the bearings 24 and 25 by this localized reduction in the thickness of their radial portions 24a and 25a between the axial bearing surface 27 and the axial portion 24b, 25b.

Figure 4:
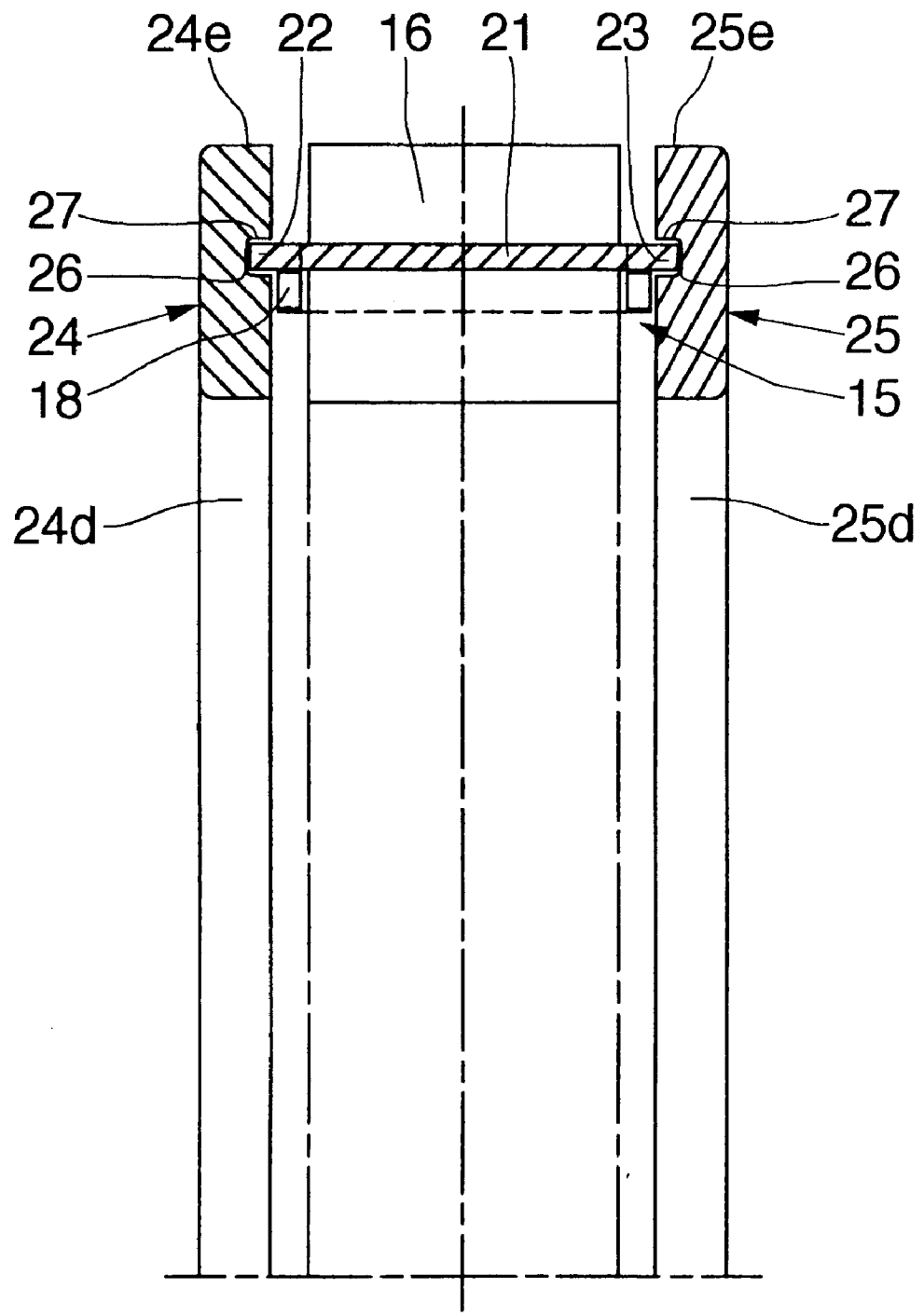
FIG. 4 is a half view in axial section of a free wheel device according to a third embodiment of the invention.

The embodiment illustrated in FIG. 4 is similar to that of FIG. 2 with the exception that each bearing 24, 25 consists in a single radial disc of approximately rectangular cross section, with no axial portion, and in which is formed a groove 26, the outer edge of which forms an axial bearing surface 27 for guiding and centring the cage 21. The bearings 24 and 25 are of the solid type and are well suited to assemblies that require a small axial size. They can be manufactured economically, for example from sintered metal with the groove 26 finished off in a subsequent operation or may be made from forged roundels finished off by turning.

By way of an alternative, it would be possible to provide a cage comprising, on one side, a radial flank to be housed inside a conventional U-section bearing, while the other side of the cage might have a free end in the form of a cylindrical edge to be centred in a radial part of a bearing according to the teaching of the invention.

The cage may be manufactured from pressed sheet, but it is also possible to envisage the use of a cage made of moulded plastic.

The invention makes it possible to produce a very economic free wheel combining a cage of simple shape which may be in the form of a simple cylinder, with bearings also of simple shape, the cage being centred in a cylindrical guiding bearing surface of the bearing so as to provide for vibration-free running.

What is claimed is:

1. Free wheel device, comprising an outer ring equipped with an interior slideway, an inner ring or shaft equipped with an exterior slideway, a free wheel placed between the slideway of the outer ring and the slideway of the inner ring and comprising a number of cams placed in windows of a cylindrical part of a single cage and providing a one-way coupling between the outer and inner rings, and at least one bearing placed radially between the outer and inner rings and intended to keep the said outer and inner rings concentric, characterized in that at least a free end of the cylindrical part of the cage is centered radially between said slideways on a cylindrical guiding bearing surface formed on the bearing adjacent to the said free end, said cylindrical guiding bearing surface being arranged so that said cylindrical guiding bearing surface is coaxial with the slideways, approximately radially mid-way between the slideways so as to achieve radial centering of said cylindrical part of the cage.

2. Device according to claim 1, characterized in that the cage consists of a single cylindrical portion.

3. Device according to claim 1, characterized in that the cage includes a cylindrical portion and a radial portion capable of coming into contact with a cylindrical portion of another bearing.

4. Device according to claim 1, characterized in that the cylindrical guide guiding bearing surface is formed by the edge of an annular groove formed in a radial part of the bearing.

5. Device according to claim 1, characterized in that the cylindrical guide bearing surface is formed by the edge of an annular shoulder formed in a radial part of the bearing.

6. Device according to claim 1, characterized in that the bearing consists of a disk provided with bearing surfaces for sliding on the outer and inner rings.

7. Device according to claim 1, characterized in that the bearing comprises a radial part and two cylindrical parts forming bearing surfaces for sliding on the outer and inner rings, the cylindrical guiding bearing surface being placed on the radial part, approximately radially mid-way between the sliding bearing surface on the outer ring and the sliding bearing surface on the inner ring.

8. Free wheel device comprising:
an outer ring equipped with an interior slideway;
an inner ring or shaft equipped with an exterior slideway; and
a free wheel placed between the slideway of the outer ring and the slideway of the inner ring and said free wheel comprising;
   a number of cams providing a one-way coupling between the outer and inner rings, and
   a single cage comprising a cylindrical part provided with windows, each cam being placed in one of said windows; and
at least one bearing placed radially between the outer and inner rings and intended to keep the said outer and inner rings concentric, said bearing being provided with a cylindrical guiding bearing surface being arranged so that said cylindrical guiding bearing surface is coaxial with the slideways, and at least a free end of the cylindrical part of the cage being centered radially between said slideways on said cylindrical guiding bearing surface adjacent to said free end, said cylindrical guiding bearing surface being approximately radially mid-way between the slideways so as to achive radial centering of said cylindrical part of the cage.

9. Device according to claim 8, wherein the cage consists of a single cylindrical portion.

10. Device according to claim 8, wherein the cage includes a cylindrical portion and a radial portion dimensioned for contact with a cylindrical portion of another bearing.

11. Device according to claim 8, wherein the cylindrical guiding bearing surface is formed by the edge of an annular groove formed in a radial part of the bearing.

12. Device according to claim 8, wherein the cylindrical guiding bearing surface is formed by the edge of an annular shoulder formed in a radial part of the bearing.

13. Device according to claim 8, wherein the bearing consists of a disk provided with the bearing surfaces for sliding on the outer and inner rings.

14. Device according to claim 8, wherein the bearing comprises a radial part and two cylindrical parts forming bearing surfaces for sliding on the outer and inner rings, the cylindrical guiding bearing surface being placed on the radial part, approximately radially mid-way between the sliding bearing surface on the outer ring and the sliding bearing surface on the inner ring.

* * * * *